(12) United States Patent
Sasaki

(10) Patent No.: US 7,172,284 B1
(45) Date of Patent: Feb. 6, 2007

(54) CLIP SUNGLASSES FOR CAP/SUNVISOR

(75) Inventor: Hideki Sasaki, Sabae (JP)

(73) Assignee: Shisendo Co., Ltd., Sabae (JP)

( * ) Notice: Subject to any disclaimer, the term of this patent is extended or adjusted under 35 U.S.C. 154(b) by 0 days.

(21) Appl. No.: 10/558,566

(22) PCT Filed: Apr. 28, 2004

(86) PCT No.: PCT/JP2004/006194

§ 371 (c)(1),
(2), (4) Date: Nov. 29, 2005

(87) PCT Pub. No.: WO2004/107022

PCT Pub. Date: Dec. 9, 2004

(30) Foreign Application Priority Data

May 30, 2003 (JP) .............................. 2003-155228

(51) Int. Cl.
*G02C 3/00* (2006.01)
(52) U.S. Cl. ..................... 351/155; 351/49; 351/158; 2/10
(58) Field of Classification Search ................. 351/41, 351/44, 49, 55, 155, 158; 2/10
See application file for complete search history.

(56) References Cited

U.S. PATENT DOCUMENTS 5,261,124 A * 11/1993 Day .................... 2/10

6,959,989 B2 * 11/2005 Holm ................... 351/155

FOREIGN PATENT DOCUMENTS

| JP | 2-75621 | 6/1990 |
|---|---|---|
| JP | 4-27419 | 3/1992 |
| JP | 4-99916 | 8/1992 |
| JP | 07-209613 | 8/1995 |
| JP | 09-230289 | 9/1997 |
| JP | 9-512925 | 12/1997 |
| WO | WO 95/30923 | 11/1995 |

\* cited by examiner

*Primary Examiner*—Huy Mai
(74) *Attorney, Agent, or Firm*—Manabu Kanesaka

(57) ABSTRACT

Clip sunglass lenses where a flip-up retention angle of a glass lens (4) is adjustable in a stepped manner and is reliably positioned at optimum positions. Clip sunglass lenses have a clip (1), an insertion member (2), a level-adjusting member (3), and a level-adjusting member (5). The clip (1) has a holding mouth (11) and a socket mouth (12) inside which notches are formed at required intervals in the insertion/removal direction. The insertion member (2) has a plug portion formed at one end and fork-shaped clasping brackets (22). The level-adjusting member (3) has connection shafts (31) with stepped notches formed at required intervals in their surfaces and has a plate surface in which cutout grooves (32) are formed. The level-adjusting buckle (5) is fixed at the central portion of the sideway-long polarized glass lens (4) and has latch projections latched to a cutout groove (32).

3 Claims, 4 Drawing Sheets

CLIP SUNGLASSES FOR CAP/SUNVISOR

TECHNICAL FIELD

The present invention relates to an improvement on an attachment mechanism through which glass lenses, sunglass lenses, or the like are attached to a cap or sun visor. Further, the present invention more particularly relates to an attachment mechanism through which polarized glass lenses can be freely rotated between a flip up position at which the polarized glass lenses are flipped up and an eyepiece position at which the polarized glass lenses are allowed to be close to eyes, and to clip sunglass lenses for a cap or sun visor in which a rotation angle position can be adjusted gradually between both positions and in which positioning can be performed simply and reliably at an optimum position.

BACKGROUND ART

Clip sunglass lenses in which a clip is clipped on a brim of a cap or sun visor so that polarized glass lenses are attached thereto have been known. Such sunglass lenses can be used easily since the polarized glass lenses can be disposed in front of eyes without employing temples and/or nose pads, whereby they win popularity among constant users of sunglasses.

With respect to such clip sunglass lenses, clip sunglass lenses in which polarized glass lenses are rotated between an eyepiece position at which they are close to the eyes of a user and a flip up position at which they are flipped up to a brim side so that they can be held at the respective positions have been proposed. (For example, see Japanese Utility Model Application Laid-Open No. 04-27419. (see p. 1, FIGS. 1 and 2))

However, in the clip sunglass lenses disclosed in this reference, the polarized glass lenses can only be rotated simply between the eyepiece position and the flip up position, and there is a problem that it is difficult to positionally adjust and hold at a position at which the glass lenses are close to the eyes of a user and to position and hold the glass lenses at an arbitrary rotation angle position between the eyepiece position and the flip up position.

Further, in these types of clip sunglass lenses, there is a drawback that the polarized glass lenses are not interchangeable in accordance with the purpose of use and weather since the polarized glass lenses cannot be detached therefrom.

The present invention has been made in consideration of the existence of the problem in conventional clip sunglass lenses as described above, and it is an object of the present invention to provide clip sunglass lenses for a cap or sun visor in which a holding angle of the polarized glass lenses can be adjusted step by step between the eyepiece position and the flip up position and in which positioning can be performed simply and reliably at an optimum position.

It is another object of the present invention to provide clip sunglass lenses in which the polarized glass lenses are interchangeable in accordance with the purpose of use and weather.

DISCLOSURE OF THE INVENTION

Means that the present inventors have adopted in order to solve the above-described problem will be described as follows with reference to the drawings.

That is, the sunglass lenses capable of being coupled with a brim B of a cap, sun visor, or the like in a clip manner so that oblong polarized glass lenses 4 can be arranged in front of the eyes of a wearer, the present invention has adopted technical means comprising: a holding mouth 11 into which said brim B is inserted by pressure so that the holding mouth 11 is coupled with said brim B; a clip 1 which is provided with a socket mouth 12 disposed in a lower side of the holding mouth 11 and in which notches 12a, 12a, . . . having a required interval are formed inside this socket mouth 12 along an extraction/insertion direction; an insertion member 2 which is provided with a plug portion 21 on one end thereof which can be freely inserted into or pulled out of a socket mouth 12 of the clip 1, the insertion member 2 having a projection 21a which is formed on the plug portion 21 and which corresponds to the notches 12a of the socket mouth 12 of said clip 1, the projection 21a being engageable with the notches 12a of the socket mouth 12, the insertion member 2 having a fork-shaped clasping bracket 22 integrally formed therewith on an end thereof which is opposite to said plug portion 21, the insertion member 2 having connection holes 22a, 22a . . . which are symmetrically formed in the respective clasping bracket 22 and which have internal tooth notches 22b, 22b, . . . on inner circumferential surfaces thereof; a level adjusting member 3 formed into a plate shape which is provided with a coupling shaft 31 which is fitted into the connection holes 22a, 22a . . . of the clasping bracket 22 of the insertion member 2 to make angle positions stable step by step through the pitch of the internal tooth notches 22b, the level adjusting member 3 having step notches 31a, 31a, which are formed on a surface of the coupling shaft 31 and which have a required interval, the level adjusting member 3 having notch grooves 32, 32, . . . which are formed on a plate surface of the level adjusting member 3; and a level adjusting buckle 5 which is a sleeve member fixed on a central portion of the oblong polarized glass lenses 4, the level adjusting buckle 5 having, on an inner periphery thereof, a hooking projection 51 which is fitted into the notch grooves 32, 32, . . . of the level adjusting member 3 so that position adjustment can be freely performed.

Further, the present invention, in order to solve the above-described problem, as the need arises, in addition to the above-described means, has adopted technical means wherein a distal end of the lower end of the level adjusting member 3 is branched into two, wherein engaging claws 33 are protruded outwardly on the distal ends of said level adjusting member 3, wherein when the lower ends are inserted into the level adjusting buckle 5, said engaging claws 33 securely engage a buckle edge portion 52 so that slipping off can be prevented, and wherein by pinching and pressing said lower ends from both side surfaces, said engaging claws 33 can be released from the engagement so as to be removed therefrom.

Moreover, the present invention, in order to solve the above-described problem, as the need arises, in addition to the above-described means, has adopted technical means wherein at least one of the clip 1, insertion member 2, level adjusting member 3, oblong polarized glass lenses 4, and level adjusting buckle 5 are made from synthesis resin.

BEST MODE FOR CARRYING OUT THE INVENTION

An embodiment of the present invention will be described below further in detail with reference to the drawings which illustrate the embodiment specifically.

The embodiment according to the present invention will be described with reference to FIGS. 1 to 8.

Figure 1:
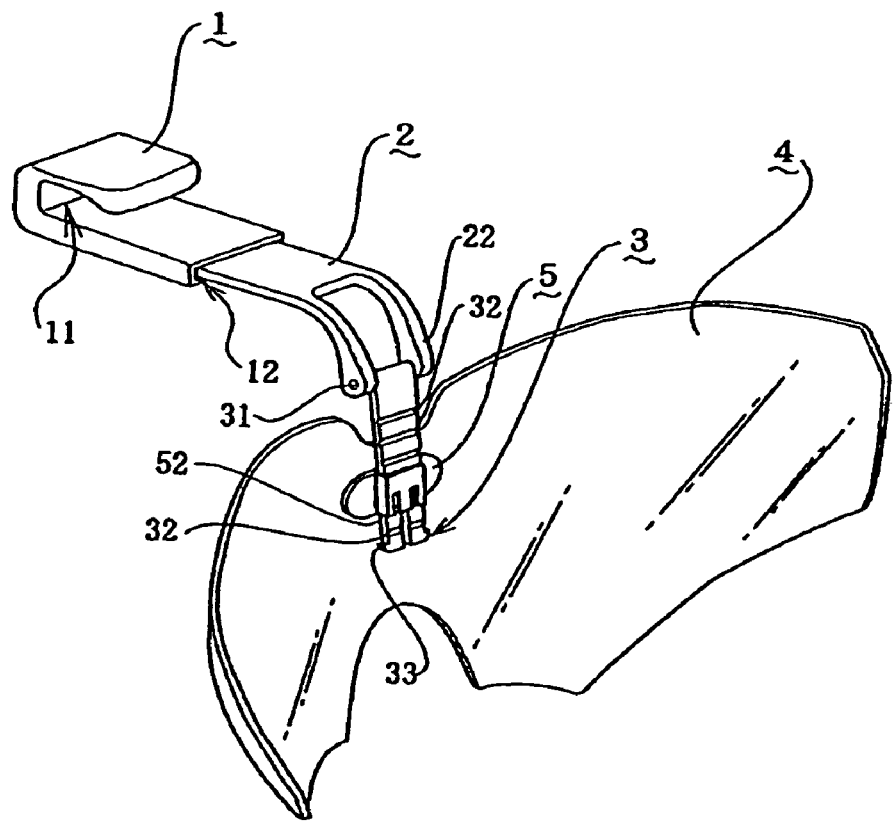
FIG. 1 is an entire perspective view showing clip sunglass lenses of an embodiment of the present invention.
Figure 2:
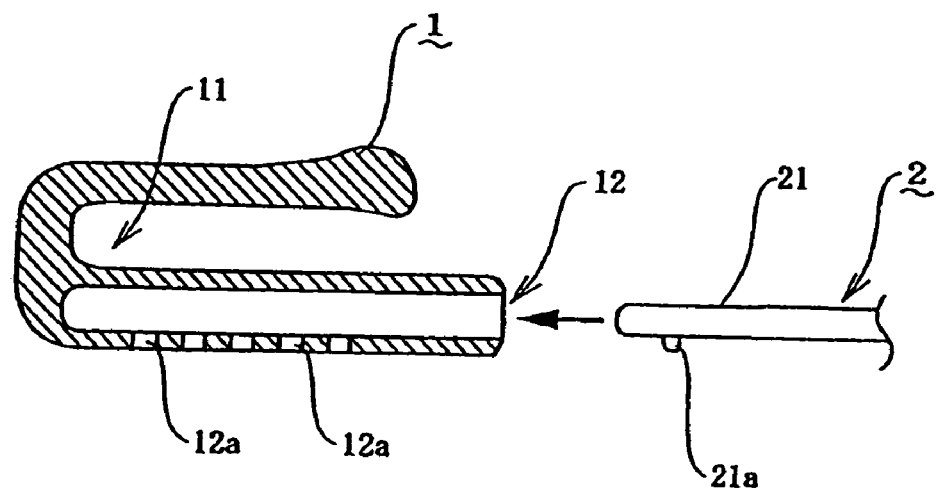
FIG. 2 is a partial vertical cross-sectional view showing a structure of the embodiment of the present invention.

The present invention is sunglass lenses which are coupled with a brim B of a cap, sun visor, or the like in a clip manner so that oblong polarized glass lenses 4 can be arranged in front of the eyes of a user (see FIG. 1).

In the drawing, reference numeral 1 denotes a clip, and this clip 1 which has a side surface roughly U-shaped. By allowing this clip 1 to pinch the brim B of a cap, sun visor, or the like, the entire sunglass lenses can be coupled with the brim B.

Provided are a holding mouth 11 into which the brim B is inserted by pressure so that the holding mouth 11 is coupled with this brim B and a socket mouth 12 disposed in a lower side of the holding mouth 11, and notches 12a, 12a, . . . having a required interval are formed inside this socket mouth 12 along an extraction/insertion direction.

Reference numeral 2 denotes an insertion member. This insertion member 2 has a plug portion 21 on its one end which can be freely inserted into or pulled out of the socket mouth 12 of the clip 1. A projection 21a which corresponds to the notches 12a of the socket mouth 12 of the clip 1 is formed on this plug portion 21. This projection 21a is engageable with the notches 12a of the socket mouth 12 (see FIG. 2).

Figure 3:
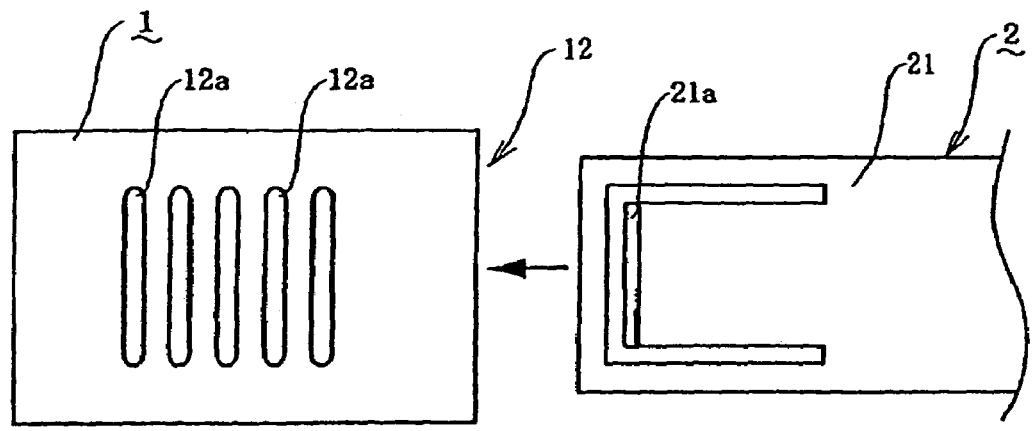
FIG. 3 is a partial underside view showing a structure of the embodiment of the present invention.
Figure 4:
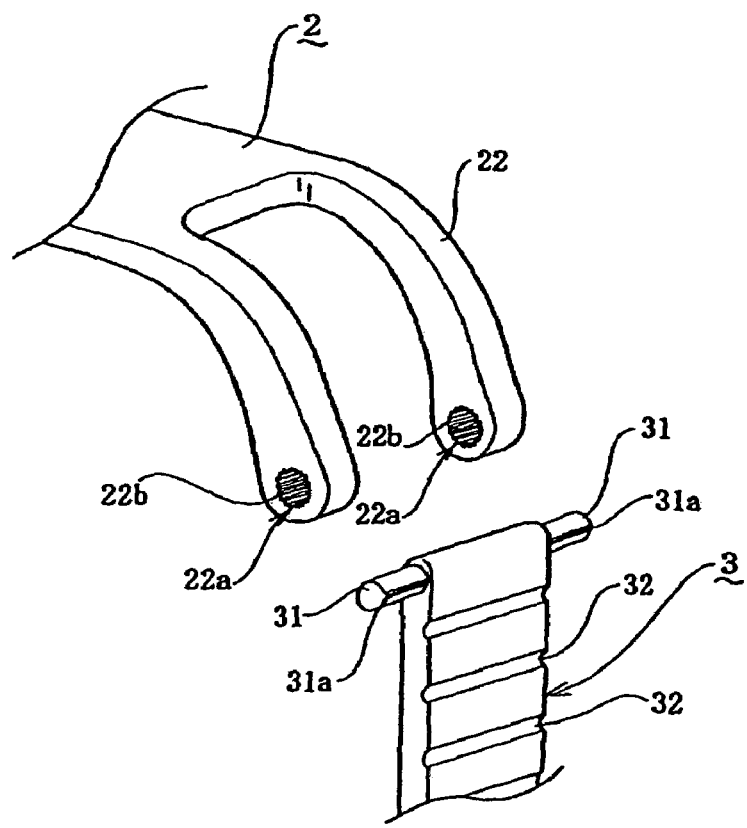
FIG. 4 is a partially exploded perspective view showing a structure of the embodiment of the present invention.

At this time, as the need arises, by allowing a periphery of the projection 21a to be notched into a lying U-shape, the projection 21a is allowed to be vertically elastically movable so that a sliding operation in forward and rearward directions can be performed smoothly (see FIG. 3).

A fork-shaped clasping bracket 22 is integrally formed with an end which is opposite to the plug portion 21 of the insertion member 2. Connection holes 22a, 22a . . . having internal tooth notches 22b, 22b, . . . on the inner circumferential surfaces thereof are formed symmetrically in the respective clasping bracket 22 (see FIG. 4).

Further, reference numeral 3 denotes a level adjusting member 3 formed into a plate shape. This level adjusting member is provided with a coupling shaft 31. This coupling shaft 31 is fitted into the connection holes 22a, 22a of the clasping bracket 22 of the insertion member 2 to make angle positions stable step by step through the pitch of the internal tooth notches 22b. Thus, step notches 31a, 31a, . . . having a required interval are formed on a surface of the coupling shaft 31, and notch grooves 32, 32, . . . are formed on a plate surface of the level adjusting member 3.

Furthermore, reference numeral 4 denotes oblong polarized glass lenses. This oblong polarized glass lenses 4 are formed by pasting a polarized film on an acrylic plate and is formed into a size by which both right and left eyes can be covered.

Reference numeral 5 denotes a level adjusting buckle. This level adjusting buckle 5 is a sleeve member which is fixed on a central portion of the oblong polarized glass lenses 4. An inner circumferential surface of the level adjusting buckle 5 has hooking projections 51 which are fitted into the notch grooves 32, 32, . . . of the level adjusting member 3 so that position adjustment can be freely performed.

Figure 5:
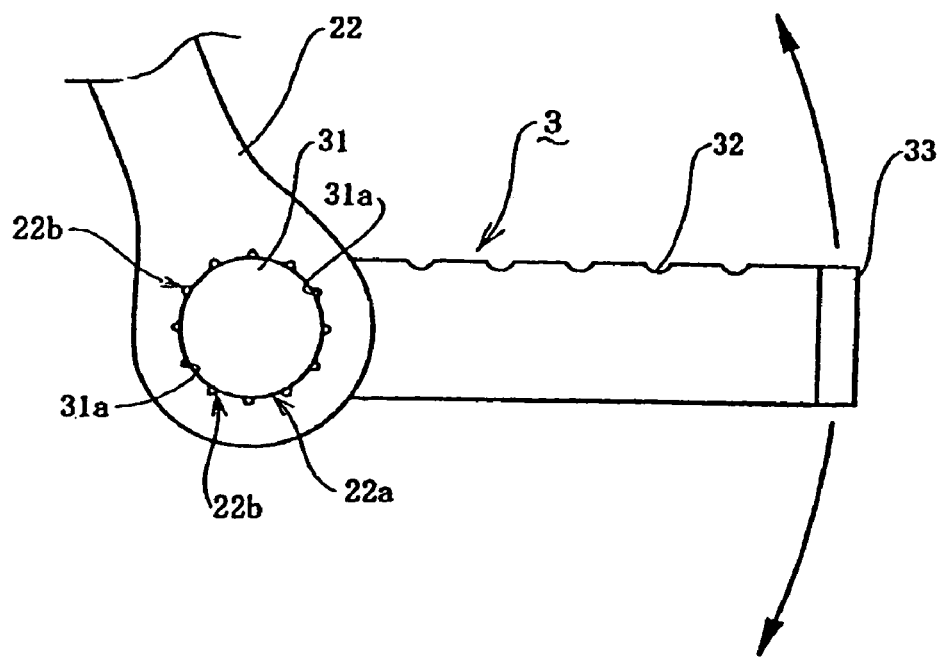
FIG. 5 is a partial side view showing a structure of the embodiment of the present invention.

In fabrication of the sunglass lenses of the present embodiment, when the coupling shaft 31 of the level adjusting member 3 is fitted into the connection holes 22a of the clasping bracket 22, the step notches 31a formed on the outer circumferential surface of the coupling shaft 31 engage the internal tooth notches 22b formed on the inner circumferential surfaces of the connection holes 22a, so that the level adjusting portion 3 is coupled with the insertion member 2 such that the level adjusting portion 3 is vertically swingable step by step (see FIG. 5).

Figure 6:
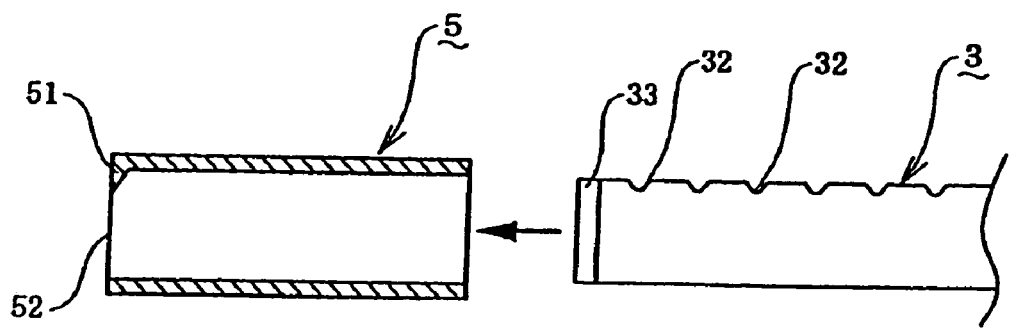
FIG. 6 is a partial vertical cross-sectional view showing a structure of the embodiment of the present invention.
Figure 7:
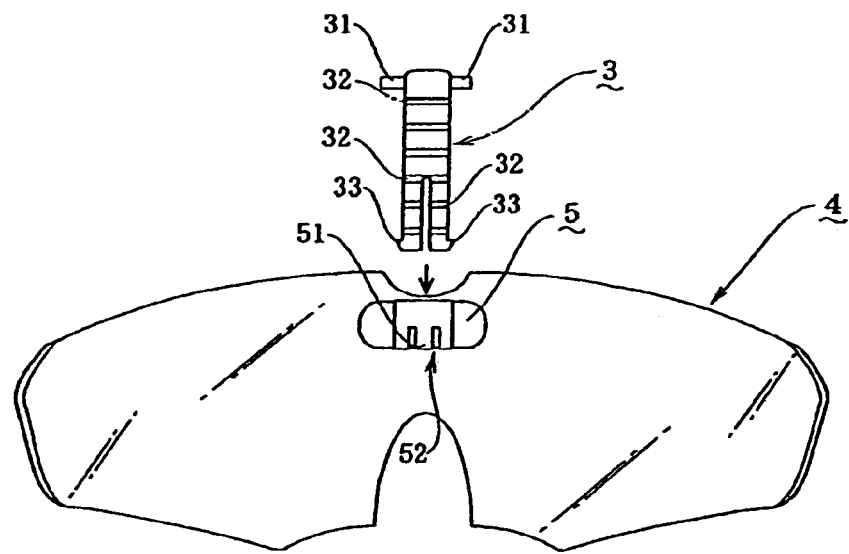
FIG. 7 is a partially exploded rear elevational view showing a structure of the embodiment of the present invention.

In this connection, by making the insertion member 2 and the level adjusting member 3 from a synthesis resin (e.g., a polyamide resin) whose surface friction coefficient is low and which has excellent smoothness properties, a notch style engagement between the projections 31a and the internal tooth notches 22b formed on the inner circumferential surfaces of the connection holes 22a can be smoothly performed (see FIG. 6).

The distal end of the lower end of the level adjusting member 3 is branched into two so that both legs thereof can be compressed elastically. Engaging claws 33 are protruded outwardly on the distal ends, and when both legs of the lower end are inserted into the level adjusting buckle 5, the engaging claws 33 securely engage a buckle edge portion 52 so that slipping off can be prevented. Meanwhile, by pinching and pressing both legs of the lower ends from both side surfaces, the engaging claws 33 can be released from the engagement so as to be removed therefrom.

At this time, similarly to the above-described insertion member 2, as the need arises, by allowing a periphery of the hooking projection 51 in the level adjusting buckle 5 to be notched into a lying U-shape, the hooking projection 51 is allowed to be vertically elastically movable so that the oblong polarized glass lenses 4 can be slid vertically smoothly.

In the present embodiment, the distal end of the lower end of the level adjusting member 3 is branched into two, and the engaging claws 33 are protruded outwardly on the distal ends, so that the engaging claws 33 securely engage the buckle edge portion 52 to allow slipping off to be prevented when these lower ends are inserted into the level adjusting buckle 5. By pinching and pressing these lower ends from both side surfaces, engagement of the engaging claws 33 can be released, whereby the oblong polarized glass lenses 4 can be taken off (see FIG. 7).

Figure 8:
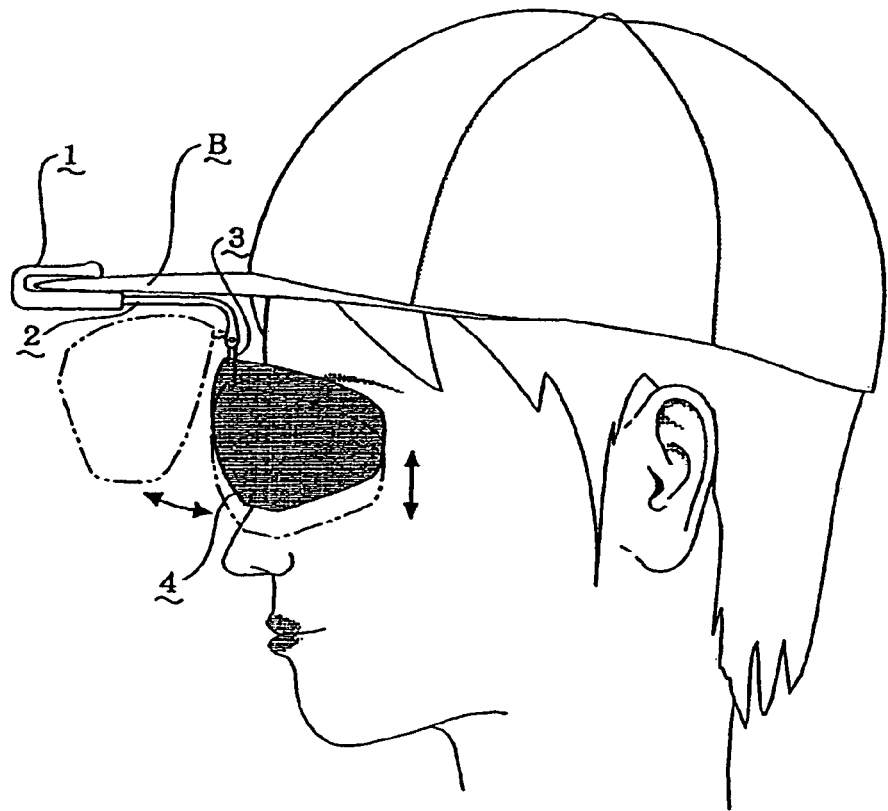
FIG. 8 is a side view showing a wearing state of clip sunglass lenses of the embodiment of the present invention.

The present embodiment fabricated in the above-described manner can be simply attached to the brim B of a cap, sun visor, or the like (see FIG. 8).

In the clip sunglass lenses of the present embodiment, the clip 1, insertion member 2, level adjusting member 3, oblong polarized glass lenses 4, and level adjusting buckle 5 can be formed from a polyamide resin, whereby having elasticity and a high wear resistance, being easily molded, and being excellent regarding the cost.

Although the present invention is fabricated roughly as described above, the present invention is not limited to the above-described embodiment, and various changes may be made within the principle and scope of "CLAIMS", and for example, even if combinations in fitting relationships of respective members (protrusions and recesses such as of projections and holes) are replaced oppositely, definitely similar effects can be obtained.

In the oblong polarized glass lenses 4, an upper end portion thereof may be bent to be formed so as to match the shape of the brim B, and an outer side portion may be bent to be formed in an eyepiece direction to enhance light shading properties. Further, a material employed in the present invention is not limited to a polyamide resin, and the clip sunglass lenses may be made from a synthesis resin such as polyacetal resin, polycarbonate resin, polyester resin, or the like, and any of them belongs to the technical scope of the present invention.

As described using the embodiment, since the clip sunglass lenses obtained by adopting the present invention is fabricated in such a way that the step notches of the coupling shaft of the level adjusting member engage the internal tooth notches formed on the inner circumferential surfaces of the connection holes, the polarized glass lenses can be held precisely not only at an eyepiece position and a flip up position but also at positions in front of the eyes of a clip-sunglass-wearing user, and they can securely placed at a certain angle position.

Since the clip sunglass lenses according to the present invention are fabricated in such a way that the projection of the plug portion engages the notch formed on the socket mouth of the holding mouth, the insertion member can be secured so as to be slidable in the forward and rearward directions. Further, similarly; since they are fabricated in such a way that the hooking projections of the level adjusting buckle engage the notch grooves formed on the level adjusting member, the level adjusting buckle can be slid vertically to be secured.

Therefore, the oblong polarized glass lenses are attachable and detachable and can be interchanged in accordance with the purpose of use and weather. Further, since the polarized glass lenses can be positioned at an optimum position simply and reliably, it is very handy, and practical utility value is very high.

INDUSTRIAL APPLICABILITY

The present invention can be adopted in all kinds and features of caps or sun visors as long as glass lenses or sunglass lenses can be attached to them.

The invention claimed is:

1. Clip sunglass lenses device for a cap or sun visor, the sunglass lenses device capable of being coupled with a brim B of a cap or sun visor in a clip manner so that oblong polarized glass lenses 4 can be arranged in front of the eyes of a wearer, comprising:

a holding mouth 11 into which said brim B is inserted by pressure so that the holding mouth 11 is coupled with said brim B;

a clip 1 which is provided with a socket mouth 12 disposed in a lower side of the holding mouth 11 and in which notches 12a, 12a having a predetermined interval are formed inside said socket mouth 12 along an extraction/insertion direction;

an insertion member 2 which is provided with a plug portion 21 on one end thereof which can be freely inserted into or pulled out of a socket mouth 12 of the clip 1, the insertion member 2 having a projection 21a which is formed on said plug portion 21 and which corresponds to the notches 12a of the socket mouth 12 of said clip 1, the projection 21a being engageable with the notches 12a of said socket mouth 12, the insertion member 2 having a fork-shaped clasping bracket 22 integrally formed therewith on an end thereof which is opposite to said plug portion 21, the insertion member 2 having connection holes 22a, 22a which are symmetrically formed in the respective clasping bracket 22 and which have internal tooth notches 22b, 22b on inner circumferential surfaces thereof;

a level adjusting member 3 formed into a plate shape which is provided with a coupling shaft 31 which is fitted into the connection holes 22a, 22a of the clasping bracket 22 of the insertion member 2 to make angle positions stable step by step through the pitch of the internal tooth notches 22b, the level adjusting member 3 having step notches 31a, 31a which are formed on a surface of the coupling shaft 31 and which have a required predetermined interval, said level adjusting member 3 having notch grooves 32, 32 which are formed on a plate surface of the level adjusting member 3; and a level adjusting buckle 5 which is a sleeve member fixed on a central portion of the oblong polarized glass lenses 4, the level adjusting buckle 5 having, on an inner periphery thereof, a hooking projection 51 which is fitted into the notch grooves 32, 32 of said level adjusting member 3 so that position adjustment can be performed.

2. The clip sunglass lenses device for a cap or sun visor according to claim 1, wherein a distal end of the lower end of said level adjusting member 3 is branched into two, and that engaging claws 33 are protruded outwardly on the distal ends of said level adjusting member 3, wherein when said lower ends are inserted into the level adjusting buckle 5, said engaging claws 33 securely engage a buckle edge portion 52 so that slipping off can be prevented, and wherein by pinching and pressing said lower ends from both side surfaces, said engaging claws 33 can be released from the engagement so as to be removed therefrom.

3. The clip sunglass lenses device for a cap or sun visor according to claim 1, wherein at least one of the clip 1, insertion member 2, level adjusting member 3, oblong polarized glass lenses 4, and level adjusting buckle 5 are made from synthesis resin.

* * * * *